United States Patent Office 2,714,099
Patented July 26, 1955

2,714,099

VINYL CONTAINING ORGANOSILOXANE FLUIDS

Donald R. Weyenberg, Midland, Mich., assignor to Dow Corning Corporation, Midland, Mich., a corporation of Michigan No Drawing. Application January 11, 1954, Serial No. 403,428

1 Claim. (Cl. 260—46.5)

The present invention relates to novel resinous organosiloxane copolymers.

Organosiloxane resins in which the substituent organic groups are methyl, phenyl, vinyl, and/or other monovalent hydrocarbon radicals are known in the art. The physical properties of organosiloxane resins such as toughness, high dielectric capacity, resistance to decomposition at high temperatures, and relatively slight change in physical properties with change in temperature make them useful in many different applications.

The siloxane resins heretofore employed in commerce have, however, suffered from the necessity of using solvents as carriers to transport the resin to the area at which it is to be deposited. The solvents must, of course, be driven off, leaving the siloxane in the desired place. This presents no problem for thin layers of the siloxane or in any application wherein the solvent may escape freely from the siloxane, but where deep sections of siloxane resin are sought or where the siloxane is employed as an impregnating resin on intricate surfaces and in restricted areas such as are found in electrical motors and generators, the escape of solvent is not readily accomplished, and voids or bubbles are present in the cured resin.

Further, the curing of commercial siloxane resins heretofore employed has generally depended upon a condensation mechanism such as the condensation of hydroxyl groups attached to silicon atoms in the siloxane molecule. This condensation produces water which also causes the formation of voids and/or bubbles in the resin during curing in those applications requiring deep sections or in restricted areas not readily open for the escape of the water vapor.

Attempts to avoid the bubble formation problem described supra during cure have been underway since siloxane resins became commercial products. One method which has been devised for preparing solvent-free, completely condensed siloxane resins is that described in U. S. Patent No. 2,610,169. Briefly, this method comprises heating a hydroxylated resin in solution in the presence of an alkaline catalyst until all the hydroxyls are condensed. The solvent is then evaporated to give a thermoplastic material which is then cured with certain catalysts to give bubble-free coatings. However, these resins are not suitable for use in intricate electrical equipment for two reasons. First, the viscosity is too high to give satisfactory impregnation, and second, even when catalysts are employed it requires too long a time to satisfactorily cure the resins.

Another method which has been employed to overcome the curing difficulties encountered in siloxane resins is that of preparing a completely condensed siloxane containing silicon bonded alkenyl groups and then to cure the siloxane by means of alkenyl polymerization. In general, this has been induced by heating with peroxide catalysts.

Whereas, resins which have been prepared heretofore by the above-noted methods cured without bubbling, they all suffered from one or more deficiencies which rendered them unsuitable for use in electrical apparatus. These deficiencies were generally of two types. Either the resins prepared did not have required thermal stability for use in high temperature applications, or they were deficient in stress-strain properties, or both. The compositions of this invention avoid all of the above difficulties, and hence, the compositions of this invention represent the first successful solventless siloxane impregnating resins.

The primary object of this invention is to provide an organopolysiloxane resin which may be employed as a solventless impregnating resin which may be polymerized and cured by means other than the condensation mechanism and which obviates the many difficulties noted above and exhibits the desirable qualities of the siloxane resins heretofore known. Other objects and advantages accruing from this invention are detailed in or will be apparent from the following description.

This invention relates to a copolymeric organosiloxane resin composed essentially of from 20 to 75 mol per cent phenylvinylsiloxane, from 80 to 25 mol per cent phenylmethylsiloxane, and up to 5 mol per cent siloxane of the unit formula $R_3SiO_{.5}$ where R is phenyl, methyl, or vinyl.

The resins of this invention are copolymers of phenylvinylsiloxane units and phenylmethylsiloxane units. It has been found that when organosiloxane units other than the two mentioned above are copolymerized in significant molar percentages with either or both of the aforementioned units, the resulting resins are inferior in many respects such as being subject to excessive cracking during the curing stage. Thus, satisfactory vinyl-containing solventless resins are not produced outside the scope of this invention. For example, a copolymer of methylvinylsiloxane units and dimethylsiloxane units was found to gel during preparation; a copolymer of methylvinylsiloxane and phenylmethylsiloxane was found to be excessively brittle and fell apart on heating; other formulations outside the scope of this invention were found to be too soft or subject to excessive cracking or in some other way deficient.

As has been shown above the compositions of this invention may contain up to 5 mol per cent $R_3SiO_{.5}$ units. These units serve as endblocks for the molecules and thus provide one method of regulating the viscosity. The operability of the compounds of this invention as impregnating solventless resins is not dependent on the presence of these groups. Specific examples of endblocks which may be employed are trimethylsiloxane, vinyldimethylsiloxane, phenyldimethylsiloxane, vinyldiphenylsiloxane, and triphenylsiloxane. The resins of this invention are preferably hydroxyl-free, although the presence of limited amounts of hydroxyls is not objectionable.

In preparing the copolymers of this invention, the viscosities of the product will vary depending upon the use to which it is to be put. Thus, the viscosity may range from fluids of 100 cs. up to non-flowing solids. The preferred viscosity for purposes of impregnation range from 1,000 to 25,000 cs. These fluids have excellent flow characteristics and are therefore eminently useful for applications requiring flow into restricted spaces or interstices.

The organosiloxane resins of this invention can be prepared by an alkaline equilibration of phenylvinylsiloxane and phenylmethylsiloxane using an alkali metal salt of an organosilanol as a catalyst. Suitable as catalysts are $KO[(CH_3)_2SiO]_3K$ and $C_6H_5(CH_3)_2SiOK$. Alternatively, the vinyl-containing organosiloxanes of this invention may be prepared by the chydrolysis of phenylvinyldichlorosilane and phenylmethyldichlorosilane with subsequent condensation resulting in the formation of the desired resinous organosiloxane copolymer. The method of preparation of the resinous materials herein disclosed is not critical, and those methods outlined above are merely preferred methods.

The copolymers of this invention are best cured by mixing them with .05 to 2.0 per cent by weight of an organic peroxide such as tertiary-butylperbenzoate, ditertiary-butylperoxide, and benzoyl peroxide, and thereafter heating the mixture at a temperature above 100° C. The resulting product is a tough, solvent-resistant resin having excellent qualities and is free of voids and/or bubbles.

The following examples will serve to give those skilled in the art a better understanding of this invention. All of the examples are merely illustrative and are not to be construed as limiting this invention, the scope of which is properly delineated in the appended claim.

All parts and percentages in the following examples are by weight unless otherwise specified.

Example 1

A flask was fitted with a thermometer and an electrically driven stirring rod. In to the flask was placed 195.4 parts of phenylvinylsiloxane cyclic tetramer, 204 parts of phenylmethylsiloxane cyclic tetramer, and 4.82 parts symmetrical divinyltetramethyldisiloxane. The flask and its contents were heated to 110° C. and .28 part of the potassium salt of phenyldimethylsilanol

$[C_6H_5(CH_3)_2SiOK]$ were added as a catalyst. The entire mixture was heated with continuous stirring to 150° C. for 3 hours. The viscosity of the mixture increased noticeably during the heating. The mixture was cooled to room temperature and .43 part of trimethylchlorosilane were added to deactivate the catalyst. The reaction mixture was stripped to 110° C. at a pressure of 10 mm. of mercury. The fluid remaining after the stripping had a viscosity of about 5,000 cs. at 25° C. and was identified as a copolymer of phenylvinylsiloxane and phenylmethylsiloxane wherein the siloxane chains were endblocked with vinyldimethylsiloxane units. 20 parts of the organosiloxane so prepared were mixed with .2 part of tertiary-butylperbenzoate. This mixture was placed in a small glass container and was pre-cured in an oven at 105°–110° C. for 20 hours. The resulting resinous material was examined at the end of the pre-cure and was found to be flexible and tough. Further curing at 200°–250° C. resulted in increased hardness but did not cause brittleness or severe discoloration. There was no bubbling during the cure periods, and no voids were present in the cured resin.

A second identical formulation of organosiloxane and tertiary-butylperbenzoate was cast into a solid resinous sheet of dimensions ⅛″ x 6″ x 6″. The mold for this casting was prepared by clamping two magnesium plates to an open-end silicone rubber chase. The mixture of organosiloxane fluid and t-butylperbenzoate was poured into the mold and cured at 110° C. for 18 hours and at 250° C. for 2 hours. From this casting, several ⅛″ x 1″ x 4″ flex-test bars were cut. Some of these samples were tested without further curing, and their flex strength was found to be 4680–4990 p. s. i.; after further curing for 50 hours at 250° C. the flex strength of the resinous molding was found to have risen to 5010–5210 p. s. i.; other of the samples were cured for 100 hours at 250° C., and a flex strength of 4780–5780 p. s. i. was obtained.

These resins performed satisfactorily as impregnating resins for electrical coils in generators and for component parts in electronic equipment.

Example 2

Employing the alkaline equilibration method of Example 1, a copolymer was prepared of 266 parts phenylmethylsiloxane cyclic tetramer, 104.5 parts phenylvinylsiloxane cyclic tetramer with 7.2 parts of divinyltetramethyldisiloxane. The copolymeric fluid thus prepared consisted essentially of 75 mol per cent phenylvinylsiloxane and 25 mol per cent phenylmethylsiloxane together with a small amount of vinyldimethylsiloxane units. When cured as described in Example 1, this copolymer gave a tough, flexible resinous material.

Example 3

2862 parts of phenylvinyldichlorosilane were placed in a flask with 3036 parts of phenylmethyldichlorosilane, and the mixture was added continuously to a hot solution of toluene and water. The toluene was present in sufficient quantity to obtain a 60 per cent solution of the hydrolyzate, and the water was present in excess of the amount required for the complete hydrolysis of the diorganodichlorosilanes. The hydrolysis was carried out at 80° C., and after it was completed the cohydrolyzate was washed neutral and divided into two equal parts designated as A and B. 10.25 parts of KOH were added to each of the two equal portions, and the mixtures were each refluxed over a water trap for 9 hours. Portion A was neutralized by adding an excess of trimethylchlorosilane, and the solvent was stripped off by heating to 150° C. at a reduced pressure of 2-10 mm. of mercury. The product was filtered and the fluid filtrate was found to have a viscosity of 1,100 cs. Ditertiary-butylperoxide was added in the amount of .2 to 1.0 per cent by weight of the copolymeric fluid, and the mixture was molded into sheets and deep sections as described in Example 1. The cured resin was tested and found to have excellent physical and chemical properties for use as potting compounds and the like.

The solvent was stripped from Portion B by heating to 150° C. at reduced pressure of 2–10 mm. of mercury, and heating was continued at 150° C. for 2 hours. The KOH catalyst was neutralized by adding an excess of trimethylchlorosilane, and the reaction mixture was filtered and again vacuum stripped to 150° C. The organosiloxane product was a fluid having a viscosity of 11,600 cs. After curing for 3–5 hours at 135° C. with .2–1.0 per cent ditertiary-butylperoxide a very hard resin was obtained. Similar results were obtained by curing with 0.5–1.0 per cent tertiary-butylperbenzoate and a curing schedule of 20 hours at 110° C. The organosiloxane prepared in this example was tested and found to contain 47 mol per cent phenylvinylsiloxane units and 53 mol per cent phenylmethylsiloxane units.

Example 4

Employing the method of Example 3 an organosiloxane fluid was prepared from 4872 parts of phenylvinyldichlorosilane and 18,325 parts of phenylmethyldichlorosilane. The resulting fluid contained 21 mol per cent phenylvinylsiloxane units and 79 mol per cent phenylmethylsiloxane units and had a viscosity of 3,000 cs. 1 per cent of ditertiary-butylperoxide was added to the organosiloxane fluid, and the mixture was cured in sheets and in deep section by heating to 135°–150° C. for from 3–5 hours. The resulting resin was flexible, tough, had excellent dielectric qualities, and cured without voids or bubbles.

That which is claimed is:

A copolymeric siloxane composed essentially of from 20 to 75 mol per cent phenylvinylsiloxane, from 25 to 80 mol per cent phenylmethylsiloxane, and up to 5 mol per cent siloxane of the unit formula $R_3SiO_{.5}$ where R is selected from the group consisting of methyl, phenyl, and vinyl radicals.

References Cited in the file of this patent

UNITED STATES PATENTS

| | | |
|---|---|---|
| 2,595,730 | Swiss et al. | May 6, 1952 |
| 2,645,628 | Hurd | July 14, 1953 |

OTHER REFERENCES

Scott et al., Journal Amer. Chem. Soc., vol. 73, 1951, pages 2599, 2600.